United States Patent
Tomiyama et al.

(10) Patent No.: US 12,147,291 B2
(45) Date of Patent: *Nov. 19, 2024

(54) IMAGE FORMING APPARATUS THAT FORMS IMAGE BASED ON INFORMATION FROM WIRELESS TAG

(71) Applicant: Toshiba Tec Kabushiki Kaisha, Tokyo (JP)

(72) Inventors: Takashi Tomiyama, Sunto Shizuoka (JP); Sadatoshi Oishi, Fuji Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,592

(22) Filed: May 16, 2023

(65) Prior Publication Data

US 2023/0289247 A1    Sep. 14, 2023

Related U.S. Application Data

(63) Continuation of application No. 17/970,013, filed on Oct. 20, 2022, now Pat. No. 11,868,196, which is a (Continued)

(30) Foreign Application Priority Data

Dec. 21, 2020   (JP) ................. 2020-211122

(51) Int. Cl.
*G06F 11/07*    (2006.01)
*B41J 3/407*    (2006.01)
(Continued)

(52) U.S. Cl.
CPC ......... *G06F 11/0733* (2013.01); *B41J 3/4075* (2013.01); *B41J 3/50* (2013.01); *B41J 29/393* (2013.01); *G06F 11/0769* (2013.01)

(58) Field of Classification Search
CPC ............ G06F 11/0733; G06F 11/0769; G06F 11/3013; G06F 11/327; B41J 3/50; B41J 29/393
See application file for complete search history.

(56) References Cited

U.S. PATENT DOCUMENTS

| 1,189,844 A | 7/1916 | Leister |
|---|---|---|
| 8,410,912 B2 | 4/2013 | Kojima |

(Continued)

FOREIGN PATENT DOCUMENTS

| EP | 2206607 A1 | 7/2010 |
|---|---|---|
| JP | 2009107280 A | 5/2009 |

(Continued)

OTHER PUBLICATIONS

Wikipedia's Hexadecimal historical version published Dec. 11, 2020 https://en.wikipedia.org/w/index.php?title=Hexadecimal&oldid=993674363 (Year: 2020).*

(Continued)

*Primary Examiner* — Joseph O Schell
(74) *Attorney, Agent, or Firm* — Kim & Stewart LLP (57) ABSTRACT

An image forming apparatus includes a wireless tag communication device to write data to, and read data from, a wireless tag attached to a sheet. An image forming device in the apparatus is configured to form an image on the sheet. A controller in the apparatus is configured to determine whether a writing of data to a wireless tag was successful based on a notification from the wireless tag communication device and generate investigation support information if the writing was not successful and control the image forming device to form an investigation support image corresponding to the investigation support information if the writing was not successful.

20 Claims, 9 Drawing Sheets

Related U.S. Application Data continuation of application No. 17/359,954, filed on Jun. 28, 2021, now abandoned.

(51) Int. Cl.
  *B41J 3/50* (2006.01)
  *B41J 29/393* (2006.01)

(56) References Cited

U.S. PATENT DOCUMENTS

| | | | |
|---|---|---|---|
| 2006/0000907 A1 | 1/2006 | Forster | |
| 2006/0071063 A1* | 4/2006 | Duckett | G06K 1/128 400/23 |
| 2009/0009790 A1 | 1/2009 | Hosokawa | |
| 2009/0108994 A1 | 4/2009 | Keeton et al. | |
| 2010/0208292 A1 | 8/2010 | Tomono | |
| 2010/0214592 A1 | 8/2010 | Muroi | |
| 2010/0245058 A1* | 9/2010 | Kojima | B41J 3/4075 340/10.52 |
| 2013/0278394 A1 | 10/2013 | Koike | |
| 2014/0036299 A1* | 2/2014 | Norota | G06F 3/121 358/1.14 |
| 2014/0293297 A1 | 10/2014 | Nagahara | |
| 2015/0170008 A1 | 6/2015 | Hashizume | |
| 2019/0141210 A1* | 5/2019 | Eiiliott | H04N 1/32138 |
| 2019/0260887 A1 | 8/2019 | Yoda | |
| 2019/0303048 A1 | 10/2019 | Suzuki | |
| 2020/0278900 A1* | 9/2020 | Abdelsalam | G06F 11/079 |
| 2020/0293244 A1* | 9/2020 | Takada | G06F 3/1254 |
| 2021/0127161 A1* | 4/2021 | Silva | H04N 21/44008 |

FOREIGN PATENT DOCUMENTS

| | | |
|---|---|---|
| JP | 2017-187881 A | 10/2017 |
| JP | 2019-185318 A | 10/2019 |

OTHER PUBLICATIONS

Wikipedia's Ink Ribbon historical version published Oct. 17, 2020 https://en.wikipedia.org/w/index.php?title=Ink_ribbon&oldid=983961724 (Year: 2020).*

Wikipedia's Toner historical version published Dec. 1, 2020 https://en.wikipedia.org/w/index.php?title=Toner&oldid=991715405 (Year: 2020).*

Extended European Search Report dated Jan. 24, 2022, mailed in corresponding European Patent Application No. 21189844.0, 10 pages.

Notice of Reasons for Refusal mailed Jun. 18, 2024 in corresponding Japanese Patent Application No. 2020-211122, with English Translation, 12 pages.

* cited by examiner

| No. | PROCESSING CONTENT | RESULT | ERROR CODE | ERROR DETAILS | TAG RSSI |
|---|---|---|---|---|---|
| 1 | WRITE (BANK 1) | SUCCESS | 0x00 | SUCCESS | -55 |
| 2 | WRITE (BANK 3) | SUCCESS | 0x00 | SUCCESS | -55 |
| 3 | WRITE (BANK 0) | FAILURE | 0x31 | TAG RESPONSE TIMEOUT | NONE |
| 4 | LOCK | NOT EXECUTED | NONE | (No data) | NONE |

FIG. 5

| MEMORY BANK | OFFSET | SIZE | DATA |
|---|---|---|---|
| 0 | 2 | 2 | AA55AA55 |
| 1 | 1 | 7 | 30001111222233334444555666 |
| 2 | (No data) | (No data) | (No data) |
| 3 | 0 | 4 | AAAABBBBCCCCDDDD |

FIG. 6

| MEMORY BANK | DATA |
|---|---|
| 0 | 00000000AA550000 |
| 1 | E7CA30001111222233334444555666 |
| 2 | E2801170 |
| 3 | AAAABBBBCCCCDDDD0000000000000000 |

FIG. 7

| DATE | 2020/07/31 13:32 |
|---|---|
| ERROR CODE | 0x31 |
| ERROR DETAILS | TAG RESPONSE TIMEOUT |
| F/W VERSION | #00 2020-03-13 |

RFID WRITE ERROR

SIMPLE INFORMATION

| DATE | 2020/07/31 13:32 |
|---|---|
| ERROR CODE | 0x31 |
| ERROR DETAILS | TAG RESPONSE TIMEOUT |
| F/W VERSION | #00 2020-03-13 |

852

DETAILED INFORMATION

PROCESSING INFORMATION

| No. | PROCESSING CONTENT | RESULT | ERROR CODE | ERROR DETAILS | TAG RSSI |
|---|---|---|---|---|---|
| 1 | WRITE (BANK 1) | SUCCESS | 0x00 | SUCCESS | -55 |
| 2 | WRITE (BANK 3) | SUCCESS | 0x00 | SUCCESS | -55 |
| 3 | WRITE (BANK 0) | FAILURE | 0x31 | TAG RESPONSE TIMEOUT | NONE |
| 4 | LOCK | NOT EXECUTED | NONE | (No data) | NONE |

WRITE INFORMATION AT TIME OF FAILURE

| MEMORY BANK | OFFSET | SIZE | DATA |
|---|---|---|---|
| 0 | 2 | 2 | AA55AA55 |
| 1 | 1 | 7 | 30001111222233334444555566 |
| 2 | (No data) | (No data) | (No data) |
| 3 | 0 | 4 | AAAABBBBCCCCDDDD |

READ INFORMATION AT TIME OF FAILURE

| MEMORY BANK | DATA |
|---|---|
| 0 | 00000000AA550000 |
| 1 | E7CA30001111222233334444555566 |
| 2 | E2801170 |
| 3 | AAAABBBBCCCCDDDD0000000000000000 |

| MEMORY BANK | OFFSET | SIZE | DATA |
|---|---|---|---|
| 0 | 2 | 2 | ******** |
| 1 | 1 | 7 | 30001111222233334444555666 |
| 2 | (No data) | (No data) | (No data) |
| 3 | 0 | 4 | AAAABBBBCCCCDDDD |

FIG. 11

| MEMORY BANK | DATA | VERIFY |
|---|---|---|
| 0 | **************** | NG |
| 1 | E7CA30001111222233334444 5555666 | OK |
| 2 | E2801170 | OK |
| 3 | AAAABBBBCCCCDDDD0000000000000000 | OK |

IMAGE FORMING APPARATUS THAT FORMS IMAGE BASED ON INFORMATION FROM WIRELESS TAG

CROSS-REFERENCE TO RELATED APPLICATIONS

This application is a continuation of U.S. patent application Ser. No. 17/970,013, filed Oct. 20, 2022, which is a continuation of U.S. patent application Ser. No. 17/359,954, filed Jun. 28, 2021, now abandoned, which is based upon and claims the benefit of priority from Japanese Patent Application No. 2020-211122, filed Dec. 21, 2020, the entire contents of each of which are incorporated herein by reference.

FIELD

Embodiments described herein relate generally to an image forming apparatus.

BACKGROUND

An image forming apparatus of one type includes a wireless tag communication device capable of writing data to a wireless tag. The image forming apparatus can also form an image on a sheet including a wireless tag therein.

A wireless tag communication device may fail to write data to the wireless tag as intended. A person investigating the cause of such a tag writing failure such as a serviceman may acquire the wireless tag provided on the sheet for which the writing has failed along with an operation log of the image forming apparatus. The investigator generally investigates the cause of the tag writing failure by searching for the job information corresponding to the failed writing from the operation log. Such a process of investigating the cause of the failure can be time consuming.

DETAILED DESCRIPTION

An object is to provide a method and apparatus permitting a cause of apparatus failure in an image forming apparatus or the like to be more easily investigated.

An image forming apparatus includes a wireless tag communication device, an image forming device, and a controller. The wireless tag communication device is configured to write data to, and read data from, a wireless tag attached to a sheet. The image forming device is configured to form an image on the sheet. The controller is configured to determine whether data writing was successful based on a notification form the wireless tag communication device, generate investigation support information when the data writing is not successful, and then control the image forming device to form an investigation support image corresponding the investigation support information.

In an image forming apparatus according to one embodiment, if writing to a wireless tag fails, the cause of the failure can be investigated more easily than in a conventional image forming apparatus. Hereinafter, the image forming apparatus according to one or more example embodiment will be described.

First, a side view of the image forming apparatus of an embodiment will be described with reference to FIG. 1.

Figure 1:
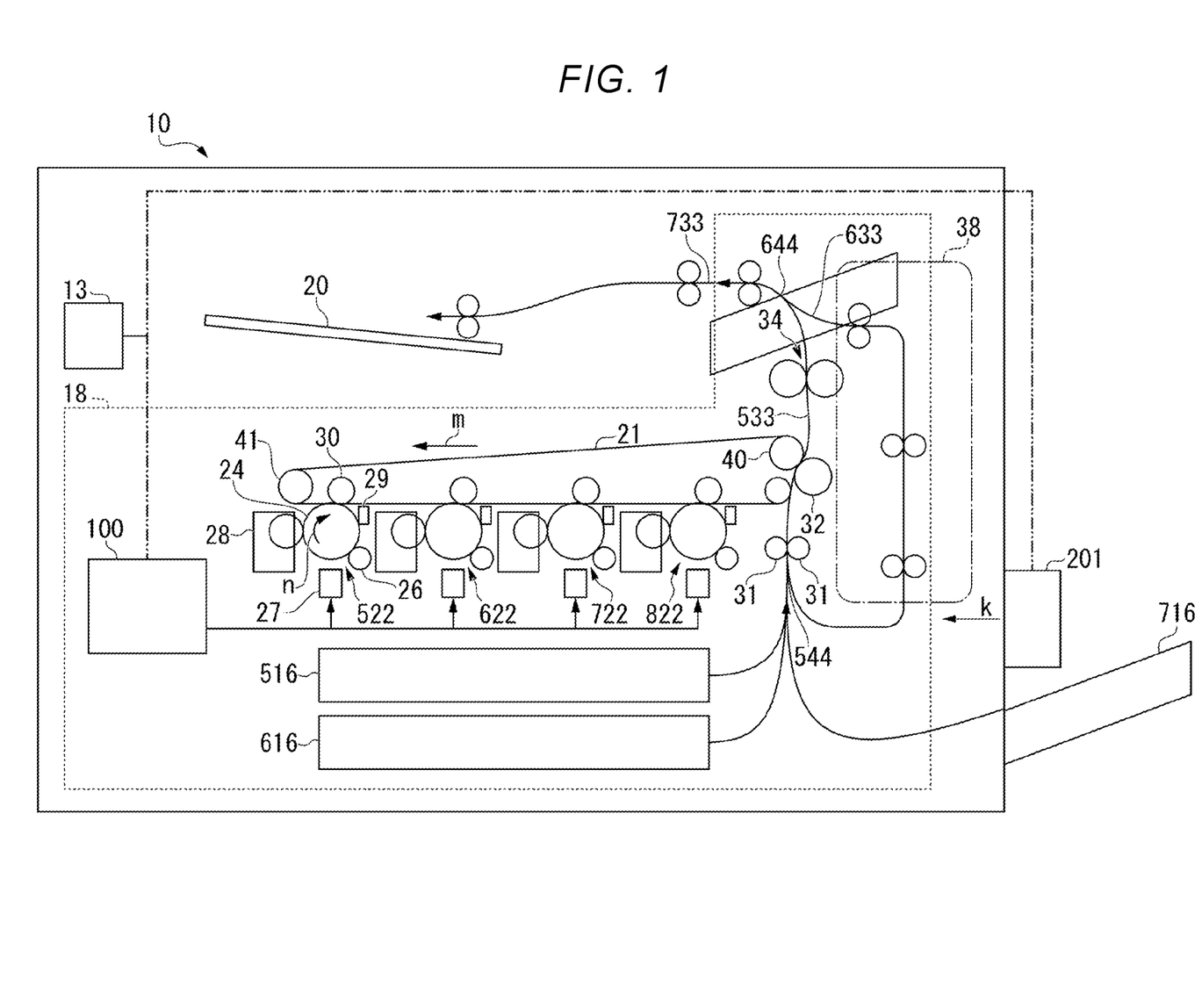
FIG. 1 illustrates a side view of an image forming apparatus according to an embodiment.

In FIG. 1, an image forming apparatus 10 includes a control panel 13, a wireless tag communication device 201, and a printer unit 18. The printer unit 18 includes a control unit 100, paper feeding cassettes 516 and 616, and the like. The control unit 100 controls the control panel 13, the wireless tag communication device 201, and the printer unit 18. The control unit 100 controls the conveyance of sheets in the printer unit 18. The control of sheet conveyance includes control of the sheet conveyance timing, the sheet stopping position(s), the sheet conveyance speed(s), and the like.

The control panel 13 includes input keys and a display unit. For example, the input key receives an input by a user. For example, the display unit is a touch panel type. The display unit accepts an input by a user and displays the input to the user. For example, the control panel 13 displays operable display items related to the operations of the image forming apparatus 10 on the display unit. The control panel 13 notifies the control unit 100 of the items selected by a user.

The paper feeding cassettes 516 and 616 store sheets provided with a wireless tag. The paper feeding cassettes 516 and 616 can also store sheets without a wireless tag (e.g., standard sheets). However, in the following description, unless otherwise specified, the sheets are assumed to include a wireless tag. For such sheets, a material such as paper or a plastic film can be used. The sheets may be printable labels in some instances.

The printer unit 18 is an example of an image forming unit, which may also be referred to as an image forming device. The printer unit 18 performs an image forming operation. For example, the printer unit 18 forms an image indicated by image data on a sheet. In the following description, forming an image on a sheet is also referred to as printing. The printer unit 18 includes an intermediate transfer belt 21. The printer unit 18 supports the intermediate transfer belt 21 with a driven roller 41, a backup roller 40, and the like. The printer unit 18 rotates the intermediate transfer belt 21 in the direction of the arrow m.

The printer unit 18 includes four image forming stations 522, 622, 722, and 822. The image forming stations 522, 622, 722, and 822 are used for image forming of Y (yellow), M (magenta), C (cyan), and K (black), respectively. The image forming stations 522, 622, 722, and 822 are disposed below the intermediate transfer belt 21 in order along the rotation direction of the intermediate transfer belt 21.

From among the image forming stations 522, 622, 722 and 822, the Y (yellow) image forming station 522 will be described as a representative example. Since the image forming stations 622, 722, and 822 have the same configuration as the image forming station 522, description thereof will be omitted.

The image forming station 522 includes an electrostatic charger 26, an exposure scanning head 27, a developing device 28, and a photoconductive cleaner 29. The electrostatic charger 26, the exposure scanning head 27, the developing device 28, and the photoconductive cleaner 29 are disposed around a photoconductive drum 24 that rotates in the direction of the n arrow.

The image forming station 522 includes a primary transfer roller 30. The primary transfer roller 30 faces the photoconductive drum 24 via the intermediate transfer belt 21.

The image forming station 522 charges the photoconductive drum 24 with the electrostatic charger 26 and then selectively exposes the photoconductive drum 24 with light from the exposure scanning head 27. The image forming station 522 thus forms an electrostatic latent image on the photoconductive drum 24 corresponding to image data or the like. The developing device 28 develops an electrostatic latent image on the photoconductive drum 24 using a two-component developer including toner and carriers.

The primary transfer roller 30 transfers the toner image formed on the photoconductive drum 24 to the intermediate transfer belt 21 (referred to as a primary transfer). The image forming stations 522, 622, 722, and 822 each form a toner image on the intermediate transfer belt 21 with a primary transfer roller 30. A full-color toner image is formed by sequentially superimposing the Y (yellow), M (magenta), C (cyan), and K (black) toner images one upon the other. The photoconductive cleaner 29 removes toner still remaining on the photoconductive drum 24 after the primary transfer.

The printer unit 18 includes a secondary transfer roller 32. The secondary transfer roller 32 faces the backup roller 40 via the intermediate transfer belt 21. The secondary transfer roller 32 transfers the color toner image from the intermediate transfer belt 21 to the sheet at the second transfer roller 32 (referred to as a secondary transfer). In the following description, the term "toner image" may refer to either a color toner image or a toner image of only one color (monochrome). In some examples, the toner image may be a toner image formed using a decolorizing (decolorizable) toner.

A conveyance path 533 is a conveyance path from a confluence portion 544 to a branch portion 644. The conveyance path 533 is a portion of a conveyance unit. The conveyance path 633 is a conveyance path that passes through a double-sided printing device 38, and is a conveyance path from the branch portion 644 to the confluence portion 544. A conveyance path 733 is a conveyance path from the branch portion 644 to a paper discharging tray 20.

The tip of the sheet taken out from the paper feeding cassette 516, the paper feeding cassette 616, or a manual feeding tray 716 is abutted against the contact portion of two stopped registration rollers 31. The inclination of the sheet abutted against the registration roller 31 is corrected. The control unit 100 starts the rotation of the registration roller 31 according to the position of the toner image formed on the rotating intermediate transfer belt 21 to move the sheet to the position of the secondary transfer roller 32 at an appropriate timing. The control unit 100 transfers the toner image formed on the intermediate transfer belt 21 to the sheet at the secondary transfer roller 32. The control unit 100 conveys the sheet to the conveyance path 533, and a fixing device 34 fixes the toner image to form a printed image on the sheet. The control unit 100 discharges the sheet by conveying the sheet to the conveyance path 733.

In the case of double-sided printing, the control unit 100 conveys the sheet (with one side already printed) to the conveyance path 733. After the sheet has fully passed through the branch portion 644, the control unit 100 switches back and conveys the sheet to the conveyance path 633. Thereafter, the control unit 100 conveys the sheet to the confluence portion 544 via the transfer path in the double-sided printing device 38, and then conveys the sheet to the conveyance path 533 again via the registration roller 31. Then, the control unit 100 forms an image on the back surface (second side) of the sheet by fixing a toner image with the fixing device 34. The control unit 100 discharges the sheet (now double-side printed) by conveying the sheet to the conveyance path 733.

The wireless tag communication device 201 can communicate with the control unit 100. The wireless tag communication device 201 reads data (information) from the wireless tag and/or writes data (information) to the wireless tag by communicating with the wireless tag on/in the sheet.

The wireless tag in the present embodiment is, for example, a radio frequency identifier (RFID) tag. The wireless tag communication device 201 transmits radio waves in the direction of the arrow k. If the writing of data to the wireless tag fails, the wireless tag communication device 201 can transmit cause investigation support information for supporting an investigation of the failure to the control unit 100. Additional aspects of the wireless tag communication device 201 and the cause investigation support information will be described below.

In general, an electrostatic latent image must be formed on the photoconductive drum 24 by the exposure scanning head 27 before the toner image can be secondarily transferred to the sheet at the secondary transfer roller 32. The electrostatic latent image formed on the photoconductive drum 24 is first transferred to the intermediate transfer belt 21 as a toner image. The toner image transferred to the intermediate transfer belt 21 is then transferred to a wireless tag sheet that was conveyed to the position of the registration roller 31.

Next, a block diagram of the image forming apparatus 10 according to the embodiment will be described with reference to FIG. 2.

Figure 2:
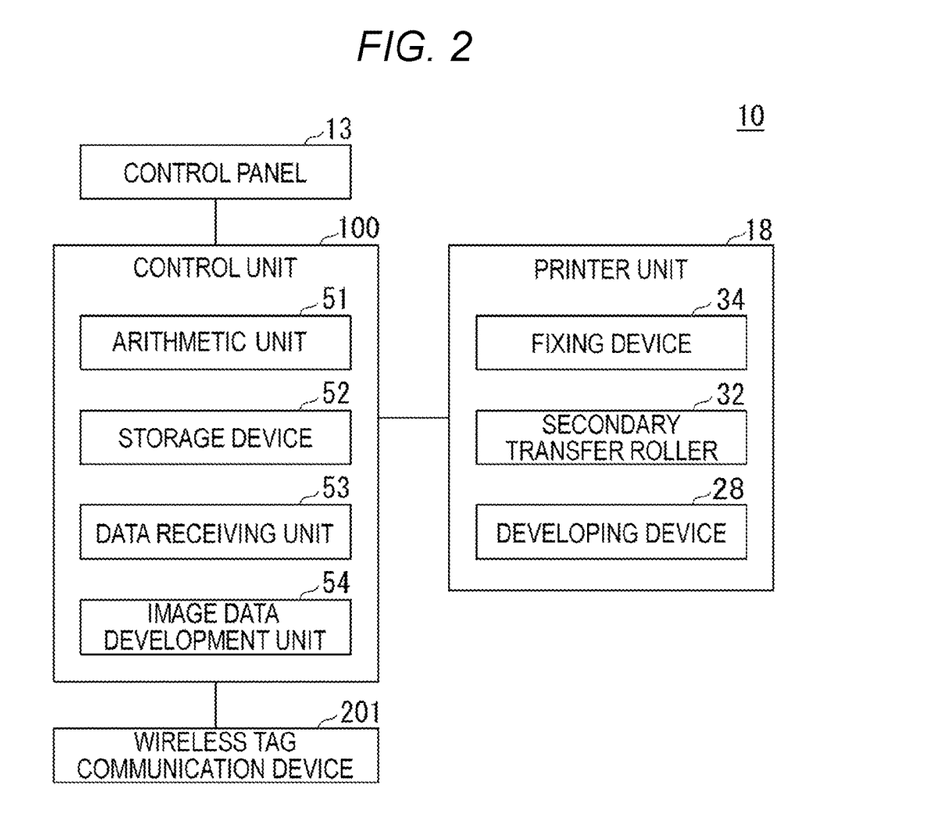
FIG. 2 is a block diagram of an image forming apparatus.

In FIG. 2, the image forming apparatus 10 includes a control unit 100, a control panel 13, a printer unit 18, and a wireless tag communication device 201.

The control unit 100 includes an arithmetic unit 51 and a storage device 52. The arithmetic unit 51 operates to control the control panel 13, the printer unit 18, and the wireless tag communication device 201 according to an image processing program stored in the storage device 52.

The arithmetic unit 51 is, for example, a central processing unit (CPU), an application specific integrated circuit (ASIC), or the like. The storage device 52 is a read only memory (ROM), a random access memory (RAM), a hard disk drive (HDD), a solid-state drive (SSD), or the like. A data receiving unit 53 receives print data corresponding to an image to be printed (for example, data described in a page description language (PDL)) from a host, such as a personal computer (PC), and stores the received print data in the storage device 52. The image data development unit 54 generates data (for example, raster data) that is printable by the printer unit 18 by determining printing conditions from the print data stored in the storage device 52 and stores the generated data in the storage device 52. Further, the data receiving unit 53 receives data from the wireless tag communication device 201, the print data, and the like.

The printer unit 18 includes the fixing device 34, the secondary transfer roller 32, and the developing device 28. The printer unit 18 forms an image on a sheet based on the data stored in the storage device 52 by the image data developing unit 54.

Figure 3:
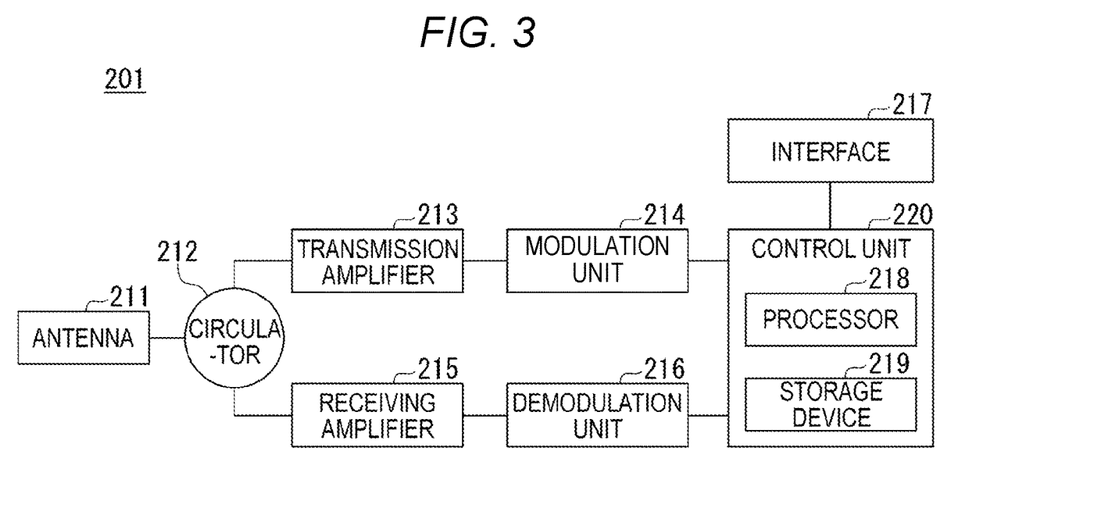
FIG. 3 is a diagram illustrating a configuration of a wireless tag communication device.

FIG. 3 is a diagram illustrating the configuration of the wireless tag communication device 201. The wireless tag communication device 201 includes an antenna 211, a circulator 212, a transmission amplifier 213, a modulation unit 214, a reception amplifier 215, a demodulation unit 216, an interface 217, and a control unit 220. The control unit 220 includes a processor 218 and a storage device 219.

The antenna 211 is for wireless tag communication. The circulator 212 outputs the signal received by the antenna 211 to the reception amplifier 215. The circulator 212 outputs the signal output from transmission amplifier 213 to the antenna 221. The reception amplifier 215 amplifies the signal received from the circulator 212 and outputs the amplified signal to the demodulation unit 216. The demodulation unit 216 demodulates the signal from the reception amplifier 215 and outputs the demodulated signal to the control unit 220. The modulation unit 214 modulates the signal from the control unit 220 and outputs the modulated signal to the transmission amplifier 213. The transmission amplifier 213 amplifies the signal received from the modulation unit 214 and outputs the amplified signal to the circulator 212. The interface 217 is an interface to the control unit 100 of the image forming apparatus 10.

The storage device 219 of the control unit 220 stores the information to be written in the wireless tag and the information read from the wireless tag. Furthermore, if a writing of information fails, the storage device 219 stores an error code or the like for identifying the cause of the writing failure.

The control unit 220 uses this error code information or the like to transmit the cause investigation support information to the control unit 100. The cause investigation support information is information for supporting the investigation of the cause of failure. Then, the cause investigation support information in the present embodiment includes simple information (simplified information) and detailed information including additional information not presented in the simple information.

The detailed information can be used by a service person, maintenance technician, advanced user or the like. The detailed information may be referred to as detailed error information or error detail information. The simple information is information that a person using the image forming apparatus such as an ordinary user of the image forming apparatus can convey to a person investigating the cause such as the service person. The simple information may be referred to as error summary information.

The detailed information includes information indicating the processing content when writing fails (referred to as "processing information"), write information that was to be written to the wireless tag (referred to as "information to be written at the time of failure"), and read information (referred to as "information read at the time of failure") that was read from the wireless tag for which writing has failed.

Figure 4:
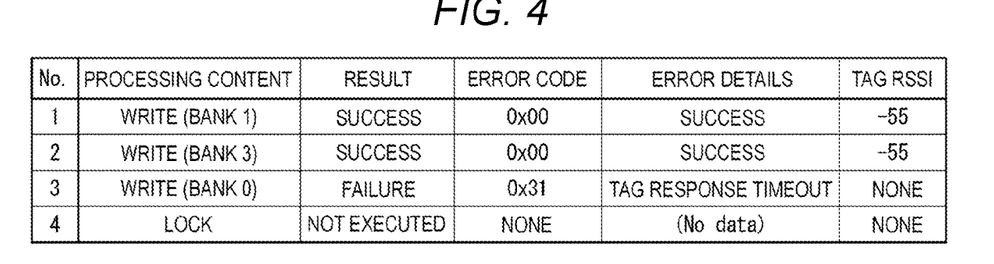
FIG. 4 is a diagram illustrating an example of an operation log or processing information stored therein.

FIG. 4 is a diagram illustrating an example of processing information. The depicted processing information includes columns for "No.", "processing content", "result", "error code", "error details", and "tag RSSI". In this context, "No." is a number for distinguishing the different entries of processing contents. The "processing content" indicates the type of processing being performed on the wireless tag. In the present embodiment, the "processing content" is an entry of "write" or "lock". The wireless tag in the present embodiment is provided with memory banks 0 to 3, and also indicates the memory bank on which "write" has been performed in the case of "write".

The "result" indicates the processing result of the processing illustrated in the "processing content". The "result" includes an entry of "success" indicating that the processing has succeeded, "failure" indicating that the processing has failed, and "not executed" indicating that the processing has not been executed.

The "error code" is an error code for identifying the cause of failure. In this embodiment, the error codes are a hexadecimal numerical value. The "error code" is uniquely defined for each error. If the "result" is "success", the error code is listed as "0x00", and if the "result" is "not executed", the error code is listed as "none" in this example.

The "error details" is the content of the error as indicated by the "error code". For example, 0x31 in the "error code" indicates a "tag response timeout". The "tag response timeout" indicates that the response from the wireless tag could not be received within a predetermined time. Moreover, since "0x00" in the "error code" indicates success, not an error, the "error details" is entered as "success". If the "error code" is "none", "error details" is entered as "No data" indicating that there is no "error details".

"Tag RSSI" indicates a signal strength (Received Signal Strength Indicator: unit is dBm) of a radio wave received from the wireless tag while executing "processing content". For example, for No. 3, a "tag response timeout," the "Tag RSSI" entry is entered as "none" because the signal was not detected during the related processing.

The "processing content", "result", "error code", "error details", and "tag RSSI" included in the processing information described above are all useful information for investigating the cause of a failure. Therefore, the cause of failure can be investigated more easily by receipt of the processing information.

Figure 5:
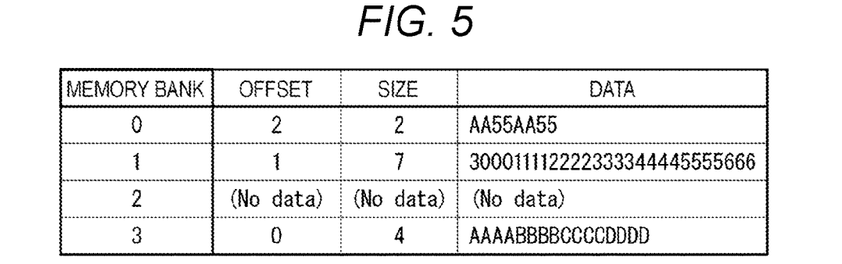
FIG. 5 is a diagram illustrating an example of information to be written at a time of failure.

FIG. 5 is a diagram illustrating an example of information to be written at the time of failure. The information to be written at the time of failure consists of columns "memory bank", "offset", "size", and "data".

The "memory bank" columns indicates a memory bank to be written. Since there are memory banks 0 to 3 in the present example, the "memory bank" is indicated by a numerical value of 0 to 3.

The "offset" entry is a value indicating how much the address at which information writing is to be started is shifted from the start address of the memory bank. The offset is indicated by the number of words. In this context, a word is a unit for writing tag information, and one word is 2 bytes. Therefore, one word can be represented by a 4-digit hexadecimal number. If no writing is performed, the "offset" is listed as "No data".

The "size" entry indicates the data size of the information to be written. The "size" is also indicated by the number of words in the manner mentioned above. Therefore, if the "size" is 2, for example, the data size of the information to be written is 2 words. If no writing is performed, the "size" is entered as "No data".

The "data" entry is the write information to be written to the wireless tag at the start of the writing processing. The "data" is written in hexadecimal. Therefore, data value of 1 word is 4 digits. If no writing is performed, the "data" entry is listed as "No data".

In FIG. 5, for example, writing to the memory bank 0 is started from a position shifted by 2 words from the start address of the memory bank 0 (the position where the start address of the memory bank 0+4 bytes). "AA55AA55" is written from this position.

The "memory bank", "offset", "size", and "data" included in the information to be written at the time of failure described above are all useful information for investigating the cause of a failure.

Figure 6:
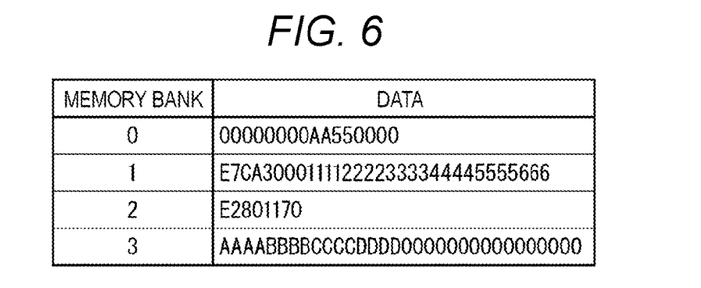
FIG. 6 is a diagram illustrating an example of information read at a time of failure.

FIG. 6 is a diagram illustrating an example of information read at the time of failure. The information read at the time of failure includes columns for "memory bank" and "data". The "memory bank" column indicates a memory bank from which data was read. Since there are memory banks 0 to 3 in the present example, the memory bank entry is indicated by numerical values of 0 to 3. The "data" entry is the read data read from the wireless tag for which writing has failed.

In the memory bank 0, it is assumed in this example that NULL was set before any data was written. In FIG. 6, it is thus illustrated that "00000000AA550000" was read from the start address of the memory bank 0. Therefore, it can be seen that the latter one word "AA55" of "AA55AA55" (see FIG. 5) was not written.

The "memory bank" and "data" entries included in the information read at the time of failure as described above are useful information for investigating the cause of failures.

Figure 7:
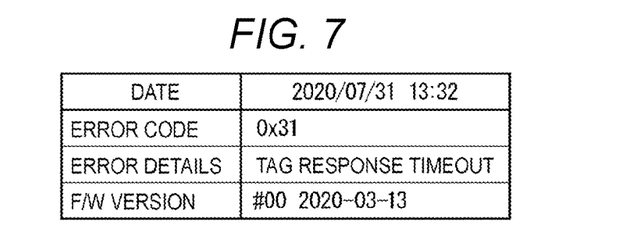
FIG. 7 is a diagram illustrating an example of simple information.

FIG. 7 is a diagram illustrating an example of simple information. The simple information consists of a "date" row/entry, "error code" entry, "error details" entry, and "F/W version" entry. In this context, "Date" indicates the date and time when the writing failed. The "error code" and "error details" are as described in FIG. 4. The "F/W version" indicates the firmware version of the wireless tag communication device 201. Thus, the simple information includes an error code. The error code can be easily transmitted to a service person or the like by the user of the image forming apparatus. Therefore, the cause of failure can be investigated even with just simple information.

Figure 8:
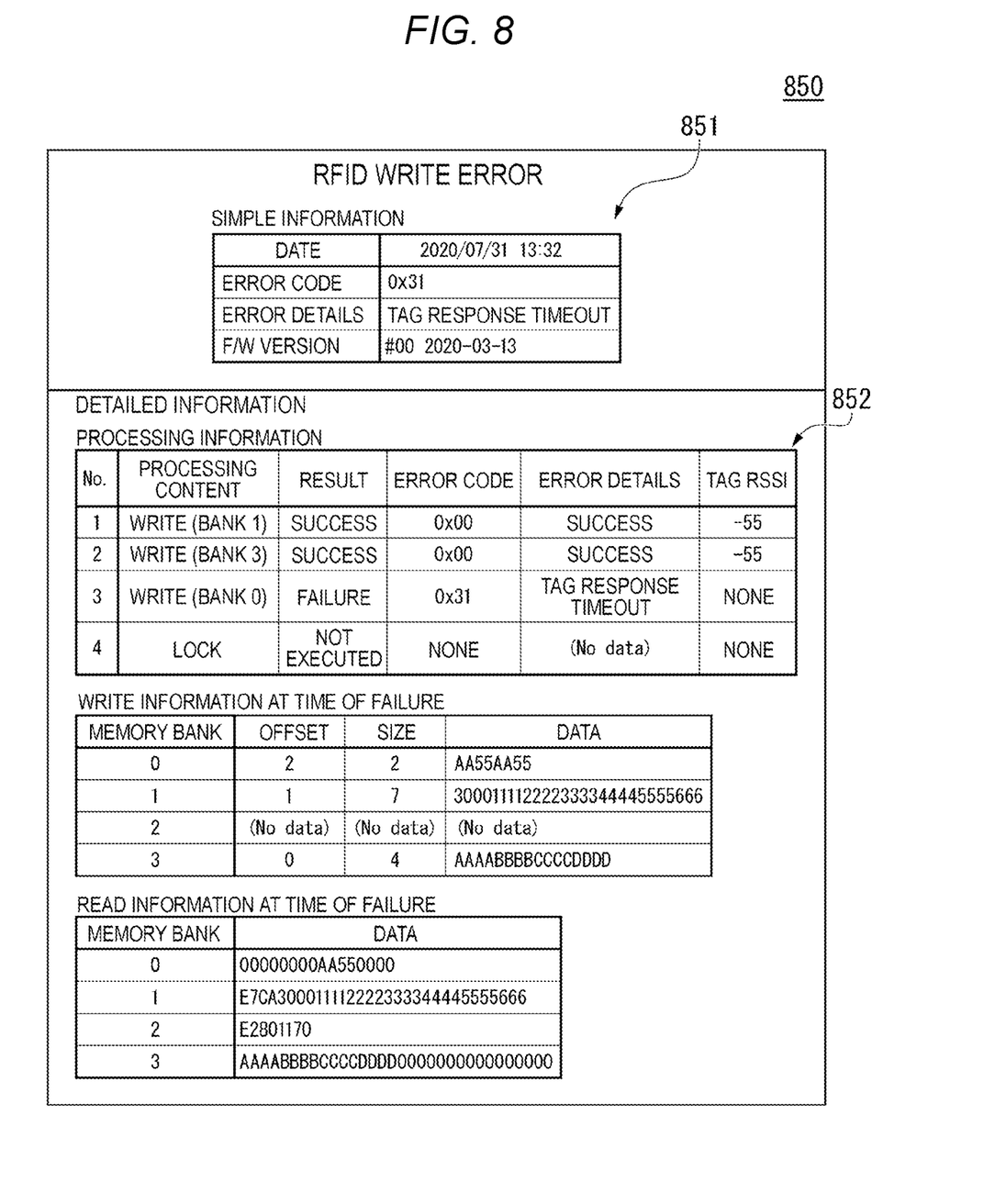
FIG. 8 is a diagram illustrating an example of a sheet on which a support image is printed.

FIG. 8 is a diagram illustrating an example of a sheet on which an image illustrating cause investigation support information (also referred to as a "support image") is formed.

In FIG. 8, a sheet 850 is a sheet for which data writing has failed with the wireless tag communication device 201. The sheet 850 is provided with a simple information column 851 and a detailed information column 852. As illustrated in FIG. 8, in the simple information column 851, an image illustrating the simple information as described in FIG. 7 (hereinafter, also referred to as "simple support image") is formed. In the detailed information column 852, an image illustrating the detailed information as described in FIGS. 4 to 6 (also referred to as "detailed support image") is formed. As described above, since the detailed information and the simple information can support the investigation of the cause of the failure, the cause of the failure can be investigated more easily using a sheet on which the image illustrating the detailed and/or simple information is formed.

In the sheet example illustrated in FIG. 8, both simple information and detailed information are formed, but either one may be formed in other examples. Further, as for the detailed information, an image illustrating any one of the processing information, the information to be written at the time of failure, and the information read at the time of failure may be formed.

Figure 9:
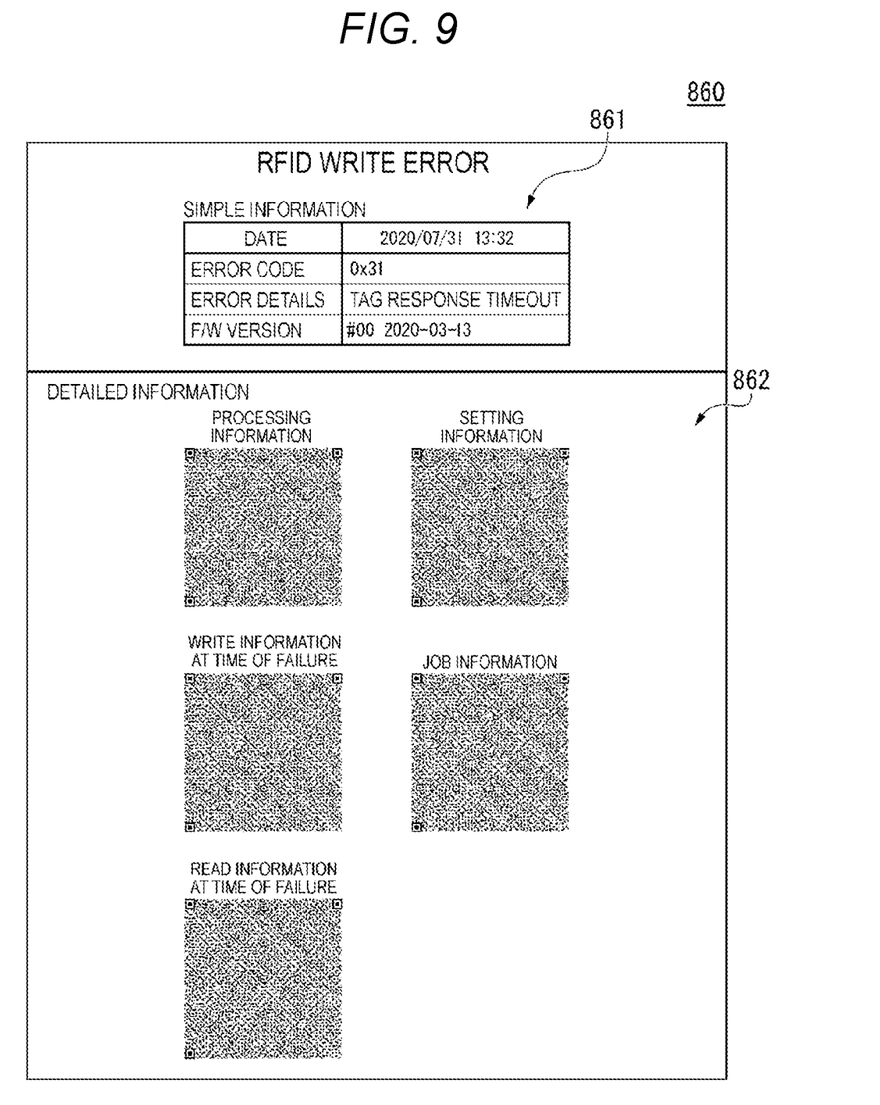
FIG. 9 is a diagram illustrating an example of a sheet using a two-dimensional code.

FIG. 9 is a diagram illustrating an example of a sheet using a two-dimensional code as a support image. In FIG. 9, a sheet 860 is a sheet in which the writing of data has failed by the wireless tag communication device 201. The sheet 860 is provided with a simple information column 861 and a detailed information column 862. As illustrated in FIG. 9, the simple support image as described in FIG. 7 is formed in the simple information column 861.

However, in the detailed information column 862, a two-dimensional code is formed in which the detailed information described in FIGS. 4 to 6 is encoded. Further, in FIG. 9, as additional detailed information, a two-dimensional code in which setting information and job information are encoded is illustrated. The setting information is information set in the wireless tag communication device 201, for example, a frequency setting and a transmission power setting. The job information is information that identifies a job during which writing has failed, or information about the job for which writing has failed. The information that identifies a job is, for example, a job ID that uniquely identifies the job. The information about a job is, for example, color printing or monochrome printing mode, and general information about a job such as the number of pages.

Since there is generally more room for space when using a two-dimensional code for the support image, as compared with the sheet example illustrated in FIG. 8, more types of support images such as setting information and job information can be formed. If a two-dimensional code is used, instead of encoding the detailed information itself, two-dimensional information obtained by encoding information from which detailed information can be obtained may be used. Examples of the information from which detailed information can be obtained include information for accessing an image forming apparatus 10 or a server capable of providing detailed information. In this way, the size of the two-dimensional code can be reduced by using the two-dimensional information obtained by encoding information from which detailed information can be obtained, and a support image can be formed even with a small sheet that does not have enough space.

It is also possible not to disclose some of the above-mentioned information in clear writing at the time of failure and information read at the time of failure. For example, in the present embodiment, the memory bank 0 is an area in which a password for locking the wireless tag is stored. Since disclosure of the password poses a security problem, an image in which the password is hidden, masked, or obscured may be formed on the sheet.

Figure 10:
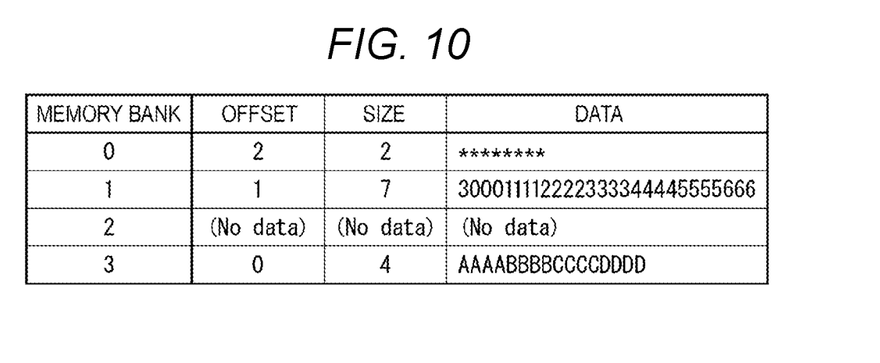
FIG. 10 is a diagram illustrating an example of information to be written at a time of failure in which a password is indicated by hidden (obscuring) characters.
Figure 11:
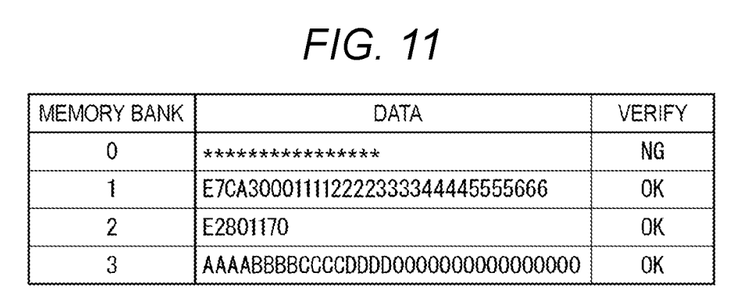
FIG. 11 is a diagram illustrating an example of information read when a password is indicated by hidden characters.

FIG. 10 illustrates an example of information to be written at the time of failure when the password is indicated by hidden characters, and FIG. 11 is a diagram illustrating an example of information read at the time of failure when the password is indicated by hidden characters. As illustrated in FIGS. 10 and 11, the data in the memory bank 0, which is the area for storing the password, is displayed as asterisks. In the example of information read at the time of failure in FIG. 11, "verify" is provided. The "verify" indicates whether or not the read data matches the written data. If the read data and the written data match, it is "OK", and if not, it is "NG" (no good). In this way, even if the password is in hidden characters, the cause investigation support information includes offset, size, number of bytes of data, and verification, and therefore the cause of failure can be investigated more easily using the sheet on which an image illustrating the information is formed.

Figure 12:
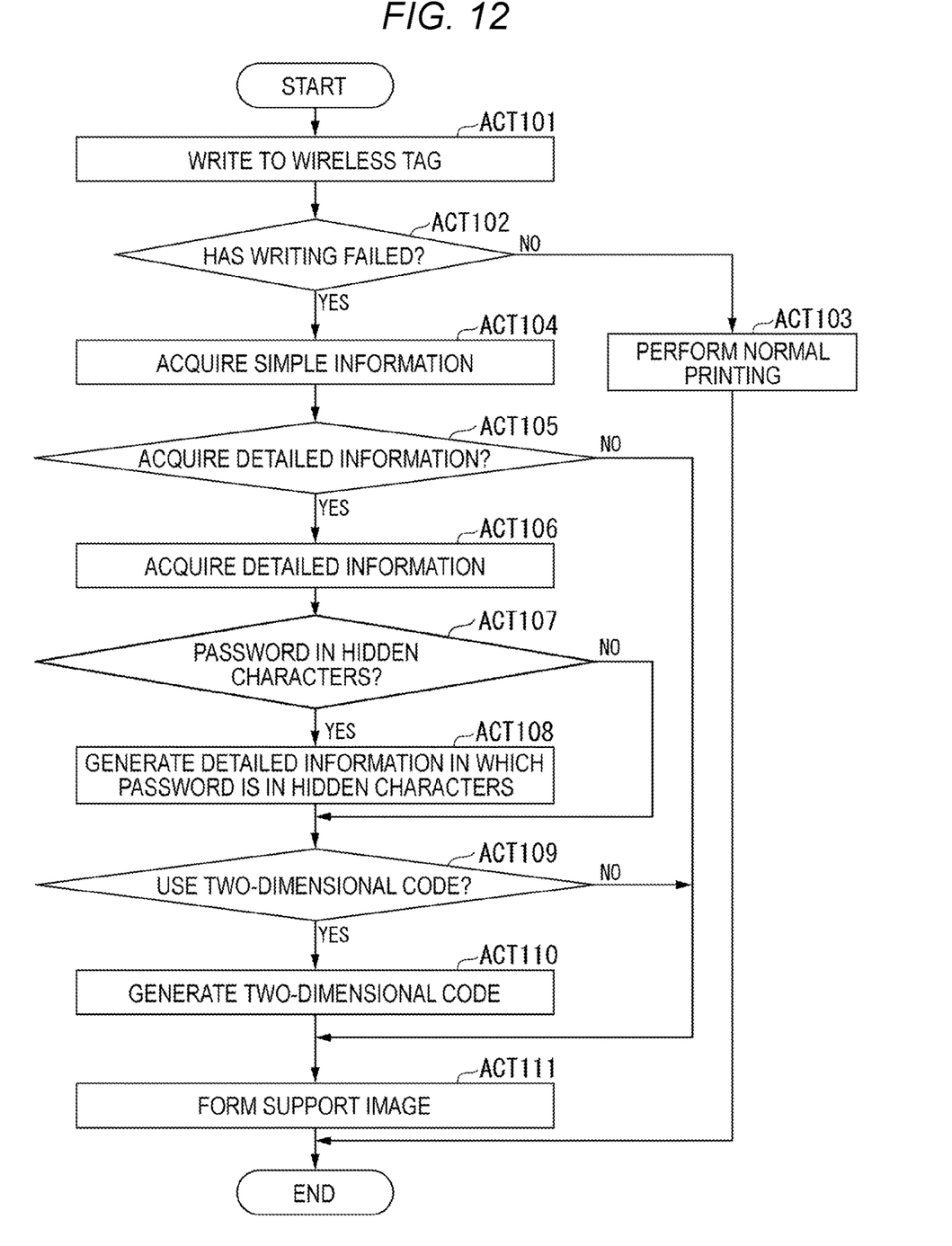
FIG. 12 is a flowchart of processing for forming a support image on a sheet.

FIG. 12 is a flowchart illustrating processing of forming a support image on the sheet. The flowchart illustrated in FIG. 12 is performed by the control unit 100. The flowchart illustrated in FIG. 12 illustrates the processing when it is possible to set whether or not to form only a simple support image on the sheet. The setting as to whether or not to form only the simple support image on the sheet is stored in the storage device 52. Further, the flowchart illustrated in FIG. 12 illustrates the processing when it is possible to set whether or not to use display password in hidden characters. The setting as to whether or not to use hidden characters for the password is stored in the storage device 52. Further, the flowchart illustrated in FIG. 12 illustrates the processing when it is possible to set whether or not a detailed support image is provided as a two-dimensional code. The setting indicating whether or not to use a two-dimensional code for the detailed support image is stored in the storage device 52.

In FIG. 12, the control unit 100 writes data to the wireless tag by the wireless tag communication device 201 (ACT 101). The control unit 100 determines whether or not the writing has failed (ACT 102). The wireless tag communication device 201 notifies the control unit 100 whether or not the writing has failed. As a result, the control unit 100 can determine whether or not the writing has failed.

If the writing does not fail (ACT 102: NO), the control unit 100 performs normal printing by the printer unit 18 (ACT 103) and ends the processing. The normal printing is to print the image to be formed on the sheet in association with the written data.

If the writing fails (ACT 102: YES), the control unit 100 acquires simple information from the wireless tag communication device 201 (ACT 104). The control unit 100 determines whether or not to acquire detailed information (ACT 105). The determination is made here by referring to the setting contents stored in the storage device 52 indicating whether to form only the simple support image on the sheet. If the control unit does not need to acquire detailed information (ACT 105: NO), the control unit 100 forms a support image with only the simple support image on the sheet (ACT 111) and ends the processing.

If the control unit 100 is to acquire detailed information (ACT 105: YES), the control unit 100 acquires the detailed information from the wireless tag communication device 201 (ACT 106).

The control unit 100 then determines whether or not to use hidden characters for the password (ACT 107). If not using hidden characters (ACT 107: NO), the process proceeds to ACT 109. If the control unit 100 is to use hidden characters for the password (ACT 107: YES), the control unit 100 generates detailed information in which the password is in hidden characters (ACT 108).

The control unit 100 then determines whether or not to use a two-dimensional code for the detailed support image (ACT 109). The determination here is made by referring to the setting contents stored in the storage device 52 indicating whether or not to use a two-dimensional code for the detailed support image. If the control unit 100 is not to use a two-dimensional code for the detailed support image (ACT 109: NO), the control unit 100 forms a support image including the simple support image and the detailed support image (w/o a two-dimensional code) on the sheet (ACT 111) and ends the processing.

If the control unit 100 is to use a two-dimensional code for the detailed support image (ACT 109: YES), the control unit 100 encodes the detailed information to generate a two-dimensional code (ACT 110). The control unit 100 forms a support image including a simple support image and the two-dimensional code on the sheet (ACT 111) and ends the processing.

In the above-described embodiment, the image forming apparatus 10 has been described as a relatively large apparatus such as a multi-function peripheral (MFP), but the present disclosure can also be applied to a relatively small apparatus such as a label printer.

Figure 13:
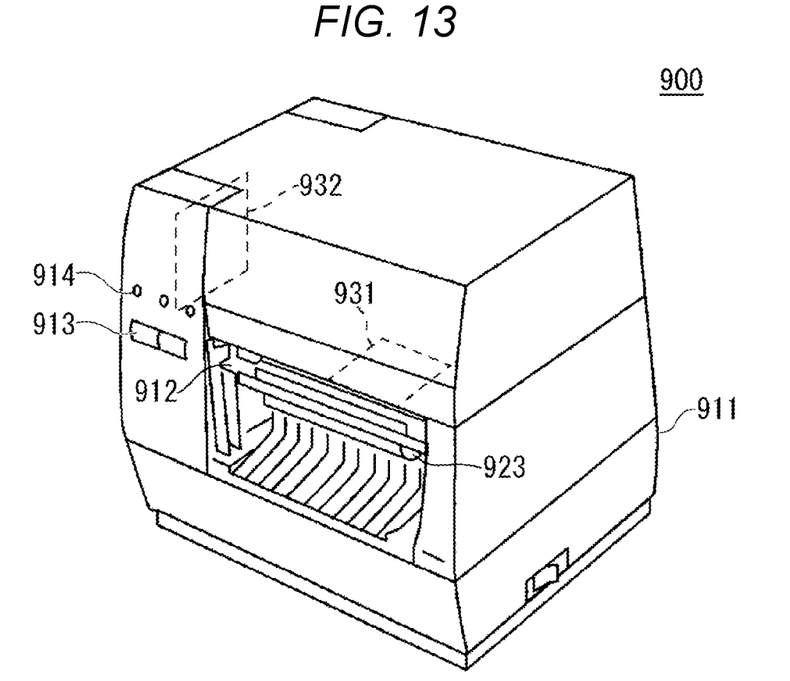
FIG. 13 illustrates a perspective view of a label printer.

FIG. 13 illustrates a perspective view of the label printer 900. The label printer 900 is provided with a paper supply unit 921 (see FIG. 14). The label printer 900 includes a housing 911, an outlet 912, an operation unit 913, an LED 914, a platen roller 923, an RFID antenna 931 and an RFID module 932.

A printed label is discharged from the outlet 912. The operation unit 913 accepts various operations from a user (e.g., a print start operation, and the like). A plurality of LEDs 914 can be provided to indicate various device states (power on/off, error, and the like) of the label printer 900. The platen roller 23 ejects the label. The RFID antenna 931 transmits a signal from the RFID module 932 and receives a signal from the wireless tag. The RFID module 932 writes data to the wireless tag and reads data from the wireless tag. In an embodiment, the RFID module 932 has the same configuration as the wireless tag communication device 201 in the first embodiment.

Figure 14:
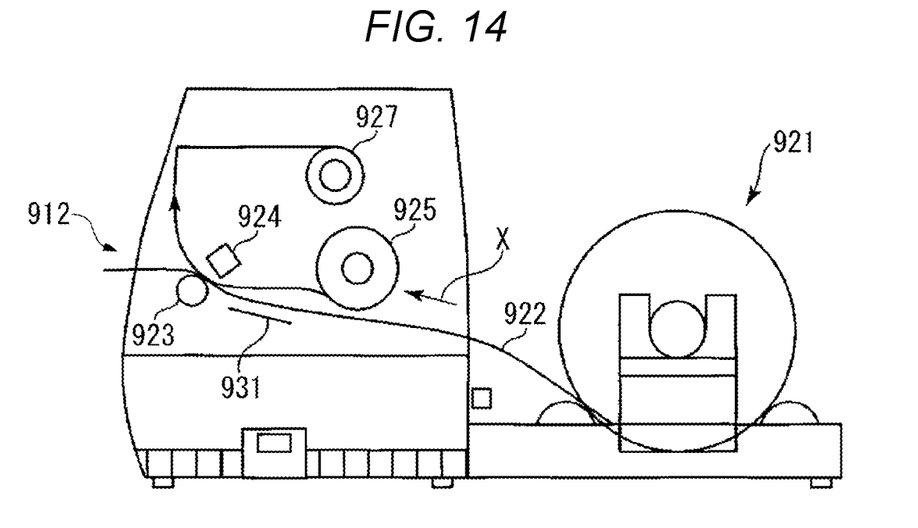
FIG. 14 is a diagram schematically illustrating a cross-section of the label printer.

FIG. 14 is a diagram schematically illustrating a cross section of the label printer 900. In FIG. 14, a paper conveying path 922 is from the paper supply unit 921 to the outlet 912. A thermal head 924 is provided at a position facing the platen roller 923 provided near the outlet 912. An ink ribbon is supplied from a roller 925, passes between the thermal head 924 and the platen roller 923, and is wound around a roller 927.

A label is conveyed from the paper supply unit 921 through the paper conveying path 922 in the X arrow direction, printed at the position where the platen roller 923 and the thermal head 924 are provided, and then discharged to the outlet 912. Since the RFID antenna 931 is provided in before the printing position, whether or not tag writing has failed can be determined in the label printer 900 before the relevant label is printed.

Figure 15:
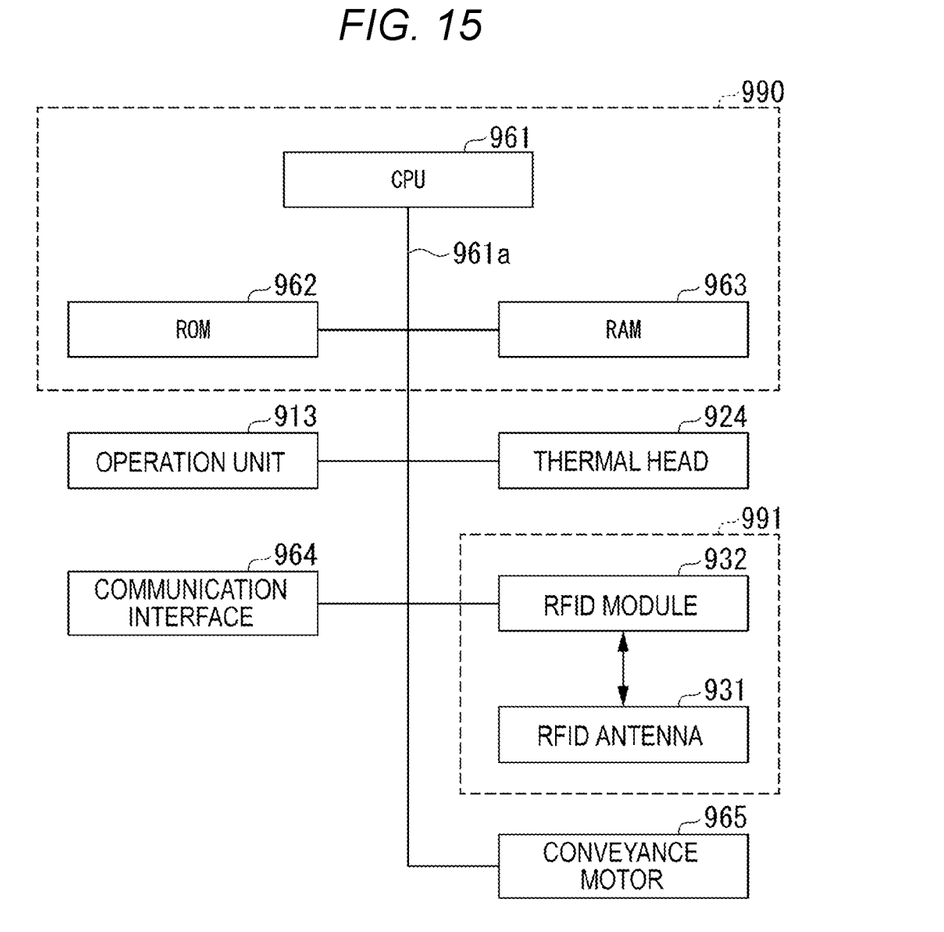
FIG. 15 is a diagram illustrating an electrical configuration of a label printer.

FIG. 15 is a diagram illustrating an electrical configuration of the label printer 900. The label printer 900 includes a control unit 990, the operation unit 913, a communication interface 964, the thermal head 924, a wireless tag communication device 991, and a conveyance motor 965.

The control unit 990 includes a CPU 961, a ROM 962, and a RAM 963. The CPU 961 controls the overall functions of the label printer 900. The ROM 962 stores programs for controlling the label printer 900 and various kinds of data. The RAM 963 temporarily stores data required for executing the programs.

The communication interface 964 is an interface for communicating with a host such as a PC. The conveyance motor 965 drives components for conveying a label. The wireless tag communication device 991 includes the RFID module 932 and the RFID antenna 931. The RFID module 932, the RFID antenna 931, the operating unit 913, and the thermal head 924 are as described above. The thermal head 924 is an example of an image forming unit.

Also in the label printer 900 described above, the processing illustrated in the flowchart illustrated in FIG. 12 can be executed. Specifically, in the description of FIG. 12, the control unit 100 can be read as the control unit 990, the printer unit 18 can be read as the thermal head 924, the storage device 52 can be read as the ROM 962, the wireless tag communication device 201 can be read as the wireless tag communication device 991, and the sheet can be read as a label.

In the case of the label printer 900, since an image is formed on a small label as compared with the sheet on which the image forming apparatus 10 forms an image, it is typically more effective to use a two-dimensional code as the support image. It may also be effective to form only a simple support image.

As described above, according to the present embodiments, the cause of tag writing failures can be investigated more easily by forming an image providing cause investigation support information on the sheet upon which tag writing has failed.

In the present examples, a support image is formed on the very same sheet for which tag writing has failed, but the present disclosure is not limited thereto. For example, a support image may be formed on another sheet that is not provided with a wireless tag. In such a case, the specific sheet for which tag writing has failed and the separate sheet on which a support image is formed may be bound together with staples or the like. As a result, it is possible to easily identify the particular sheet for which tag writing has failed. In this way, even if the support image is formed on a different sheet from that on which the tag writing has failed, the cause of the failure can be investigated.

In the example embodiments, the image forming apparatus 10 also includes the wireless tag communication device 201 therein, but in other examples there may be a different configuration in which the wireless tag communication device 201 is not included within the image forming apparatus 10 itself. Even in the case of such another configuration, if writing of tag information fails in a wireless tag communication device 201, investigation support information for supporting the investigation of the cause of the failure can be acquired by the image forming apparatus 10.

In the above examples, the detailed information is information that includes more detailed information as compared with the simple information. Further, the detailed information is the information for an investigator, and the simple information is the information that a person using the image forming apparatus sends to the investigator such as a serviceman. Specific examples of detailed information in that case are illustrated in FIGS. 4 to 6, and specific examples of simple information are illustrated in FIG. 7, but is not limited thereto. For example, the simple information may be information including at least an error code. Further, the detailed information may be information including at least one of the write information to be written to the wireless tag at the start of the writing processing and the read information read from the wireless tag for which writing has failed. With any information, the cause of failure can be investigated more easily.

Certain functions of an image forming apparatus 10 and a label printer 900 in the above-described embodiments may be implemented as software executed by a computer. In such a case, a program for performing these functions may be recorded in a non-transitory computer readable recording medium, and a computer system may read and execute the program recorded in the recording medium. The "computer system" referred to here can include an operating system (OS) and additional hardware such as peripheral devices. In addition, the "non-transitory computer-readable recording medium" is, for example, a portable medium such as a flexible disk, a magneto-optical disk, a ROM, a CD-ROM or the like, or a storage apparatus such as a hard disk built in the computer system. Further, the "non-transitory computer-readable recording medium" may accessible via a communication line and a program can be transmitted via a network such as the Internet or a telephone line. Such a network accessible storage medium may be one or more servers, virtualized machines, or the like. In addition, the above program may be for performing a part of the above-described functions and further, may be achieved by combining the above-described functions with a program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a wireless tag reader writer configured to write data to, and read data from, a wireless tag attached to a sheet;
a printer configured to form an image on the sheet; and
a controller configured to:
determine whether a writing of data to the wireless tag was successful based on a notification from the wireless tag reader writer;
generate investigation support information when the writing was not successful; and
control the printer to form, on the sheet to which the wireless tag is attached, an investigation support image corresponding to the investigation support information and including an error code identifying a specific error event based on which the writing was determined to be not successful,
wherein the investigation support image includes error summary information and error detail information different from the error summary information, the error detail information including at least one of:
an identification of one of a plurality of storage locations of the wireless tag at which the specific error event occurred during the writing, the identification being associated with the error code;
a value of write data, which is data that has been written to the wireless tag during the writing; and
a value of read data, which is data that has been read from the wireless tag for which the writing was determined to be not successful.

2. The image forming apparatus according to claim 1, wherein the error code is hexadecimal.

3. The image forming apparatus according to claim 1, wherein the investigation support image includes a two-dimensional code encoding at least a part of the investigation support information.

4. The image forming apparatus according to claim 1, wherein the investigation support image includes text of the error summary information and text of the error detail information.

5. The image forming apparatus according to claim 1, wherein the investigation support image includes text of the error summary information and a two-dimensional code encoding at least a part of the error detail information.

6. The image forming apparatus according to claim 1, wherein
the error detail information includes the value of the write data, and
the controller is further configured to obscure confidential information included in the write data.

7. The image forming apparatus according to claim 6, wherein the error detail information includes the value of the write data with the obscured confidential information, the value of the read data, and information indicating whether the write data and the read data match.

8. The image forming apparatus according to claim 7, wherein the confidential information included in the write data is a password for locking the wireless tag.

9. The image forming apparatus according to claim 1, wherein the controller is configured to receive image data associated with the data written to the wireless tag, and control the printer to form an image based on the image data when the writing was successful.

10. The image forming apparatus according to claim 9, wherein the printer does not form the investigation support image when the writing was successful.

11. The image forming apparatus according to claim 1, wherein the wireless tag reader writer includes an antenna positioned to transmit and receive signals for data writing and reading to the sheet before the sheet is conveyed for forming the image on the sheet.

12. The image forming apparatus according to claim 1, wherein the printer uses toner for forming images on the sheet.

13. The image forming apparatus according to claim 1, wherein the printer uses an ink ribbon for forming images on the sheet.

14. The image forming apparatus according to claim 1, wherein the error detail information includes the identification of one of the plurality of storage locations, the value of write data, and the value of the read data.

15. The image forming apparatus according to claim 1, wherein the error summary information includes neither the value of the write data nor the value of the read data.

16. The image forming apparatus according to claim 1, wherein each of the error summary information and the error detail information includes the error code.

17. A method for controlling an image forming apparatus comprising:
receiving, from a wireless tag reader writer, data that has been read from a wireless tag attached to a sheet;
determining whether a writing of data to the wireless tag was successful based on a notification from the wireless tag reader writer;
generating investigation support information when the writing was not successful; and
controlling a printer to form, on the sheet to which the wireless tag is attached, an investigation support image corresponding to the investigation support information and including an error code identifying a specific error event based on which the writing was determined to be not successful,
wherein the investigation support image includes error summary information and error detail information different from the error summary information, the error detail information including at least one of:
an identification of one of a plurality of storage locations of the wireless tag at which the specific error event occurred during the writing, the identification being associated with the error code;
a value of write data, which is data that has been written to the wireless tag during the writing; and
a value of read data, which is data that has been read from the wireless tag for which the writing was determined to be not successful.

18. The method according to claim 17, wherein the error code is hexadecimal.

19. The method according to claim 17, wherein the investigation support image includes a two-dimensional code encoding at least a part of the investigation support information.

20. The method according to claim 17, wherein the investigation support image includes text of the error summary information and text of the error detail information.

* * * * *